United States Patent [19]

DeWilde et al.

[11] Patent Number: 4,586,185
[45] Date of Patent: Apr. 29, 1986

[54] PASSIVE APPARATUS FOR STABILIZING A FLASHLAMP-PUMPED DYE LASER

[75] Inventors: Mark A. DeWilde, Forest Hill; Leon J. Decker, Aberdeen, both of Md.

[73] Assignee: The United States of America as represented by the Secretary of the Army, Washington, D.C.

[21] Appl. No.: 486,160

[22] Filed: Apr. 18, 1983

[51] Int. Cl.$^4$ ................................................ H01S 3/04
[52] U.S. Cl. ........................................ 372/34; 372/69; 372/54; 372/35
[58] Field of Search ................ 372/29, 54, 69, 34, 372/39, 59, 70

[56] References Cited

PUBLICATIONS

DeWilde et al.; "A Simple Modification to Increase Stability of a Linear Flashlamp–pumped Dye Laser"; Applied Spectros., vol. 36, No. 3, 1982.

*Primary Examiner*—Léon Scott, Jr.
*Attorney, Agent, or Firm*—Anthony T. Lane; Robert P. Gibson; Michael C. Sachs

[57] ABSTRACT

A passive thermal control system for a flashlamp-pumped dye laser utilizes heated deionized water in a heat exchanger located in the reservoir of the dye lasing solution to minimize the temperature gradients in the dye lasing solution by decreasing the difference in temperature between the dye lasing solution and the deionized water flashlamp coolant.

5 Claims, 2 Drawing Figures

PASSIVE APPARATUS FOR STABILIZING A FLASHLAMP-PUMPED DYE LASER

GOVERNMENTAL INTEREST

The invention described herein may be manufactured, used and licensed by or for the Government for governmental purposes without the payment to us of any royalty thereon.

FIELD OF THE INVENTION

This invention relates to passive thermal control of a dye laser in order to achieve stability in the laser beam output.

BACKGROUND OF THE INVENTION

Various means have been used in the prior art to improve the stability of flashlamp pumped dye lasers. In the past the active lasing media comprised an organic dye dissolved in a solvent such as methanol. The dye solution is normally pumped from a tap water cooled reservoir to a transparent glass dye flow tube, which is positioned proximate to the laser flashlamp, so that light from the flashlamp can be focussed into the dye. The dye solution is then returned to the dye reservoir. A portion of the energy from the flashlamp is converted to a usable laser beam while the remainder is converted to heat and must be removed by a dye reservoir heat exchanger. In addition, in the past a second tap water cooled heat exchanger was utilized to get rid of heat absorbed by a deionized water cooling system which surrounds the flash tube. Cooling of the flash tube is necessary to prevent early life burnouts. The problem with the aforementioned prior art system of cooling was the lack of control of temperature between the dye solution and the deionized water cooling water system. It is well known in the art that these aforementioned differences in temperature produce instabilities in laser beam output, and thus dictate the use of active heating and cooling devices to maintain the temperature, individually, in each of the two fluid systems. The failure to match the temperature of the dye in the dye flow tube to that of the deionized water in the cooling jacket for the flash tube results in abrupt thermal gradients in the dye flow tube causing lens effects and reduced laser output.

SUMMARY OF THE INVENTION

A passive thermal control system is utilized for regulating the temperature gradient of the dye lasing solution and cooling solutions of a flashlamp-pumped dye laser.

An object of the present invention is to provide passive thermal control to reduce the temperature gradient between a dye flow control tube and a deionized water jacket of a flashlamp-pumped dye laser.

Another object of the present invention is to eliminate the need of active heating and cooling systems for a dye and deionized water reservoirs of a flashlamp-pumped dye laser.

A further object of the present invention is to eliminate laser output instability of a flashlamp-pumped dye laser.

For better understanding of the present invention, together with other and further objects thereof, reference is made to the following descriptions taken in connection with the accompanying drawings.

BRIEF DESCRIPTION OF THE DRAWINGS

Throughout the following description like reference numerals are used to denote like parts of the drawings.

DESCRIPTION OF THE PRIOR ART

Figure 1:
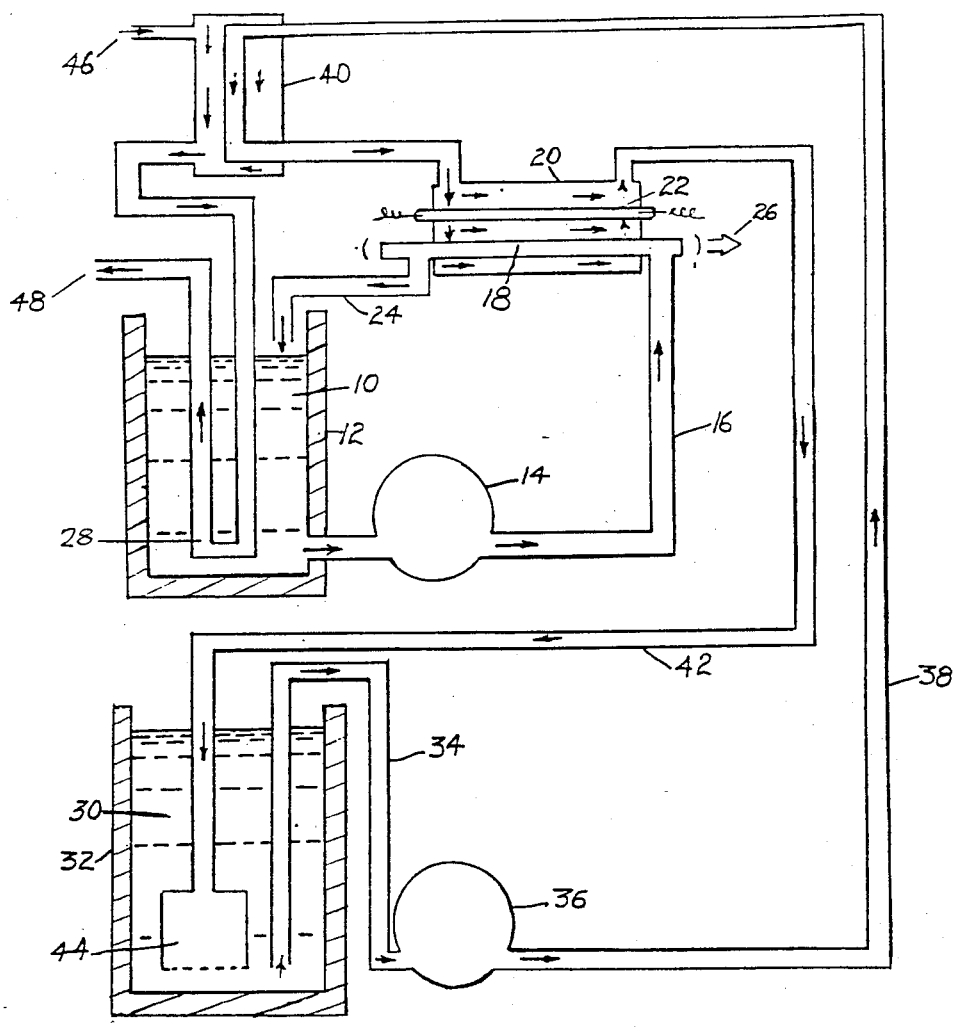
FIG. 1 is a schematic drawing showing a prior art cooling system for a flashlamp-pumped dye laser.

Referring now to FIG. 1 active lasing media solution 10 includes an organic dye disolved in a solvent, such as methanol, and is stored in a first reservoir 12. The dye solution 10 is circulated by a first pump 14 through a conduit 16 to a transparent glass dye flow tube 18 which is positioned in water jacket 20 so that it is proximate to flashlamp 22 so that the light from flashlamp 22 can be focussed into the dye contained within dye flow tube 18. The dye solution 10 returns to the dye reservoir 12 through conduit 24. As previously stated, some of the energy of the flashlamp 22 is converted to a usable laser beam 26 while the rest of the energy is converted to heat which is partially removed by a first heat exchanger 28 located in first reservoir 12. The remaining heat energy contained within water jacket 20, is removed in order to prolong flashlamp 22 life. This is accomplished by circulating deionized water 30 contained within a second reservoir 32 through conduit 34 to second pump 36 which causes deionized water to be pumped via conduit 38 to a second heat exchanger 40 and thence to water jacket 20 via conduit 41. The heated deionized water of water jacket 20 is returned via conduit 42 to second reservoir 32 through filter 44 to help preserve the deionized water purity. Tap water, which is supplied to second heat exchanger 40 via inlet 46, is circulated as shown to carry heat away from both heat exchangers 28 and 40 and then carried to a drain via tap water outlet conduit 48. As previously stated, the prior art of FIG. 1 results in a substantial difference in temperature of the dye lasing medium contained in the dye flow tube 18 and the temperature of the deionized water in the cooling jacket 20. This temperature difference results in abrupt thermal gradients in the dye and instability in laser output beam because of lens effects.

DESCRIPTION OF THE PREFERRED EMBODIMENTS

Figure 2:
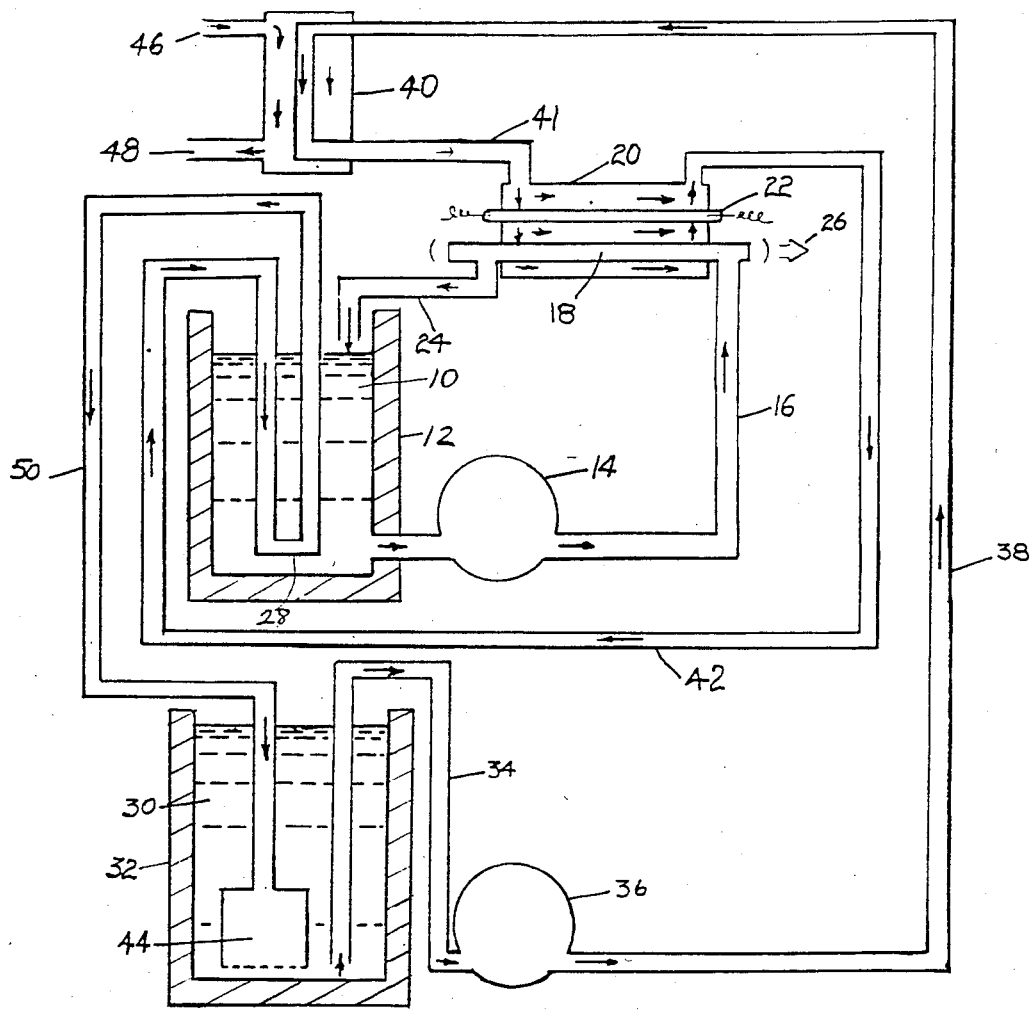
FIG. 2 is a schematic drawing of the improved cooling system for a flashlamp-pumped dye laser used in the present invention.

Referring now to FIG. 2, dye lasing media solution 10 contained in a first reservoir 12 is pumped by a first pump 14 through conduit 16 into glass dye flow tube 18 in deionized water jacket 20 so that it is proximate flashlamp 22. The dye media is returned to reservoir via conduit 24 in the same manner as aforedescribed for the prior art of FIG. 1. In the present invention, the deionized water 30 contained in the second reservoir is fed via conduit 34 to second pump 36 and thence to second heat exchanger 40 by conduit 38. The output of the deionized water is fed to water jacket 20 input by conduit 41 as previously described. In the present invention the heated deionized water 30 carried by output conduit 42 rather than being returned to the second reservoir 32 is fed to the dye first heat exchanger 28, located in the first reservoir 12 and then via conduit 50 to the second reservoir 32 via filter 44. The tap water drain outlet 48 is made directly from the second heat exchanger 40 rather than from the first heat exchanger 28. Second heat exchanger 40 in the preferred embodiment provides a means for extracting the excess energy generated by the flashlamp 18 in water jacket 20 without accentuating the difference in temperature between the deionized water $T_1$ and the dye lating media $T_2$. The heated deionized water 30 in water jacket 20 is directed to the first heat exchanger 28 to passively adjust the differential of deionized water temperature $T_1$ to the dye lasing solution temperature $T_2$ in the dye lasing tube 18 to a minimum. The following is a table of the temperature relationships in degrees centigrade (C) for several variations of ambient room and tap water temperatures showing a maximum difference in temperature $\Delta$ of $T_2-T_1$ of 0.9 degrees C for a tap water difference in temperature of 9.7° C. The relatively small variation in the difference of temperature between the deionized water in the water jacket 20 and the dye lasing solution 30 in the dye flow tube 18 limits the critical thermal gradients in the dye flow tube 18 and thus at no-cost achieves stabilization of the laser beam 26 of FIG. 2.

| Room Temp. | Tap Water Temp. | Deionized Water Temp($T_1$) | Dye Sol. Temp. Temp Tz | $T_2-T_1$ $\Delta$ |
|---|---|---|---|---|
| 23.2 | 20.3 | 25.4 | 26.0 | 0.6 |
| 24.7 | 25.8 | 29.4 | 30.3 | 0.9 |
| 23.4 | 30.0 | 32.1 | 32.3 | 0.2 |

While there has been described and illustrated specific embodiments of the invention, it will be obvious that various changes, modifications and additions can be made herein without departing from the field of the invention which should be limited only by the scope of the appended claims.

What is claimed is:

1. In a flash lamp pumped, dye laser apparatus comprising a flash lamp and a liquid dye solution in a transparent compartment proximate to the flash lamp, said compartment also connected to a tubular circulatory system for moving said liquid dye, said dye solution activated by flashing of said lamp for lasing to emit light, said lamp and compartment enclosed in a cooling first water jacket, said jacket enclosing deionized water for cooling, an improved cooling system wherein the temperature of said deionized water and said liquid dye solution are maintained within 0.5° C. of one another, enabling said laser for pulsing at a stabilized 10 pulses per second rate, said cooling system further comprising:
first heat exchange reservoir (12) for receiving a bath of laser dye liquid 10 from said tubular circulatory system (24, 26) connected thereto, and a first pump means (14) for pumping said dye liquid from said first reservoir and through said compartment 18 and back to said reservoir in a closed system through said tubular system; first pipe means 28 submerged in said first reservoir for heat exchange purposes, carrying deionized water in a closed loop (42, 50, 34, 38, 41) including said first jacket, and further including a second reservoir (32) having a second pipe means, opened for pouring deionized water thereinto (30) through a water filter means 44 submerged in said second reservoir and siphoning deionized water therefrom, said deionized water pumped through said closed loop by a second pumping means 36 said second closed loop passing through a second water jacket means 40 for cooling said deionized water closed loop enclosed in said second jacket, said jacket having tap water circulating therethrough.

2. Apparatus as recited in claim 1 wherein said dye solution includes an organic dye in a solvent material such as methanol.

3. Apparatus as recited in claim 2 wherein said dye tubular circulatory systems includes a transparent glass tube.

4. Apparatus as recited in claim 3 wherein said water filter means is for filtering the return flow of said deionized water into said second reservoir means.

5. Apparatus as recited in claim 4 including means for limiting the difference in said dye lasing solution temperature $T_2$ from said deionized water temperature $T_1$ to a range of 0.2–0.9 degrees centigrade when said tap water temperature varies approximately 10.0 degrees centigrade.

* * * * *